United States Patent
Thantharate et al.

(10) Patent No.: US 11,177,836 B1
(45) Date of Patent: Nov. 16, 2021

(54) ADAPTING WIRELESS COMMUNICATION DEVICE ANTENNA SELECTION BASED ON USER IDENTITY AND OPERATION CONTEXT

(71) Applicant: T-MOBILE INNOVATIONS LLC, Overland Park, KS (US)

(72) Inventors: Anurag Thantharate, Overland Park, KS (US); Sreekar Marupaduga, Overland Park, KS (US); Sougata Saha, Olathe, KS (US); Hannah J. Sifuentes, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/905,562

(22) Filed: Jun. 18, 2020

(51) Int. Cl.
| | |
|---|---|
| *H04M 1/66* | (2006.01) |
| *H04M 1/68* | (2006.01) |
| *H04M 3/16* | (2006.01) |
| *H04B 1/00* | (2006.01) |
| *H04W 12/06* | (2021.01) |
| *H04M 1/72418* | (2021.01) |
| *H04M 1/72463* | (2021.01) |
| *H04W 88/06* | (2009.01) |

(52) U.S. Cl.
CPC ...... *H04B 1/0053* (2013.01); *H04M 1/72418* (2021.01); *H04M 1/72463* (2021.01); *H04W 12/06* (2013.01); *H04W 88/06* (2013.01)

(58) Field of Classification Search
CPC ............ H04B 1/0053; H04M 1/72463; H04M 1/72418; H04W 12/06; H04W 88/06
USPC ........................................................ 455/411
See application file for complete search history.

(56) References Cited

U.S. PATENT DOCUMENTS

| | | | |
|---|---|---|---|
| 2011/0093913 A1* | 4/2011 | Wohlert ............. | H04W 12/082 726/1 |
| 2017/0103388 A1* | 4/2017 | Pillai ....................... | H04W 4/02 |
| 2019/0268740 A1* | 8/2019 | Lei ......................... | G07C 5/008 |
| 2020/0053802 A1* | 2/2020 | Li ....................... | H04L 41/5077 |

\* cited by examiner

*Primary Examiner* — Tanmay K Shah

(57) ABSTRACT

A mobile communication device that adapts its usage of antennas based on a rule set and an operation context. The device comprises a plurality of antennas, a radio modem, a processor, a non-transitory memory, and a client application stored in the non-transitory memory. When executed by the processor, the application receives a biometric input for authenticating a session of a user on the device, wherein the biometric input is associated with a biometric profile, sends a request for a rule set to a server computer, and receives the rule set. The application further stores the rule set, evaluates the rule set based on the operation context to determine an antenna operation setting, and commands the radio modem to configure itself to the antenna operation setting, whereby the radio modem is restricted from using all of the plurality of antennas at the same time in at least some operation contexts.

20 Claims, 7 Drawing Sheets

ADAPTING WIRELESS COMMUNICATION DEVICE ANTENNA SELECTION BASED ON USER IDENTITY AND OPERATION CONTEXT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cellular communication networks provide cellular service to mobile communication devices in the geographic area the cellular communication network covers. Cellular networks began with first generation (1G) networks and have evolved through various generations, increasing in capacity and capabilities through each generation. As the successor to 4G/Long Term Evolution (4G/LTE) networks, 5G is the fifth generation telecommunications standard for cellular communication networks. Compared to its predecessors, 5G networks provide enhanced speed through greater capacity. Many mobile communication devices that support 5G have multiple input and multiple output (MIMO) and carrier aggregation technologies in order to meet the requirements called for by the increased bandwidth.

SUMMARY

In an embodiment, a mobile communication device that adapts its usage of antennas based on a rule set and based on an operation context of the mobile communication device is disclosed. The mobile communication device comprises a plurality of antennas, a radio modem, a processor, a non-transitory memory coupled to the processor, and a client application stored in the non-transitory memory. When executed by the processor, the client application authenticates a session of a user on the mobile communication device based on an input on the mobile communication device associated with an identity of the user, wherein the identity of the user is associated with a subscriber identifier of an account of the user, sends a request for a rule set to a server computer via the radio modem, where the request identifies the user of the mobile communication device by the subscriber identifier, and receives the rule set from the server computer, wherein the rule set is associated with a subscriber profile identified by the subscriber identifier. The client application further stores the rule set in the non-transitory memory, evaluates the rule set based on the operation context to determine a radio modem antenna operation setting, and commands the radio modem to configure itself to the radio modem antenna operation setting, whereby the radio modem is restricted from using all of the plurality of antennas at the same time in at least some operation contexts of the mobile communication device.

In another embodiment, a method of adapting antenna usage by a mobile communication device based on a rule set and based on an operation context of the mobile communication device is disclosed. The method comprises authenticating, by a client application executing on a processor of a mobile communication device, a session of a user on the mobile communication device based on an input on the mobile communication device associated with an identity of the user, wherein the identity of the user is associated with a subscriber identifier of an account of the user, sending a request for a rule set to a server computer by the client application, where the request identifies the user of the mobile communication device by the subscriber identifier, and receiving the rule set by the client application from the server computer via an application programming interface (API), where each rule of the rule set associates an antenna operating setting to an operation context. The method further comprises storing the rule set on the mobile communication device by the client application, determining an operation context of the mobile communication device by the client application, identifying a selected antenna operation setting in the rule set by the client application that associates to the determined operation context of the mobile communication device, and commanding a radio modem of the mobile communication device to configure itself to the selected antenna operation setting, whereby the radio modem is restricted from using all of a plurality of antennas of the mobile communication device at the same time in at least some of the operation contexts of the mobile communication device.

In yet another embodiment, a method of adapting antenna usage by a mobile communication device based on a rule set and based on an operation context of the mobile communication device is disclosed. The method authenticating, by a client application executing on a processor of a mobile communication device, a session of a user on the mobile communication device based on an input on the mobile communication device, wherein the input is associated with an identity of the user, determining an operation context of the mobile communication device by the client application, identifying a selected antenna operation setting in a rule set stored on the mobile communication device by the client application that associates to the determined operation context of the mobile communication device, and commanding a radio modem of the mobile communication device to configure itself to the selected antenna operation setting, whereby the radio modem is restricted from using all of a plurality of antennas of the mobile communication device at the same time. The method further comprises, initiating, by the mobile communication device, a phone call to emergency services (E911), receiving an antenna operation setting override command by the client application via an application programming interface (API) from an emergency system external to the mobile communication device, and based on the antenna operation setting override command, commanding the radio modem by the client application via the API to configure itself to use all of the plurality of antennas of the mobile communication device at the same time.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
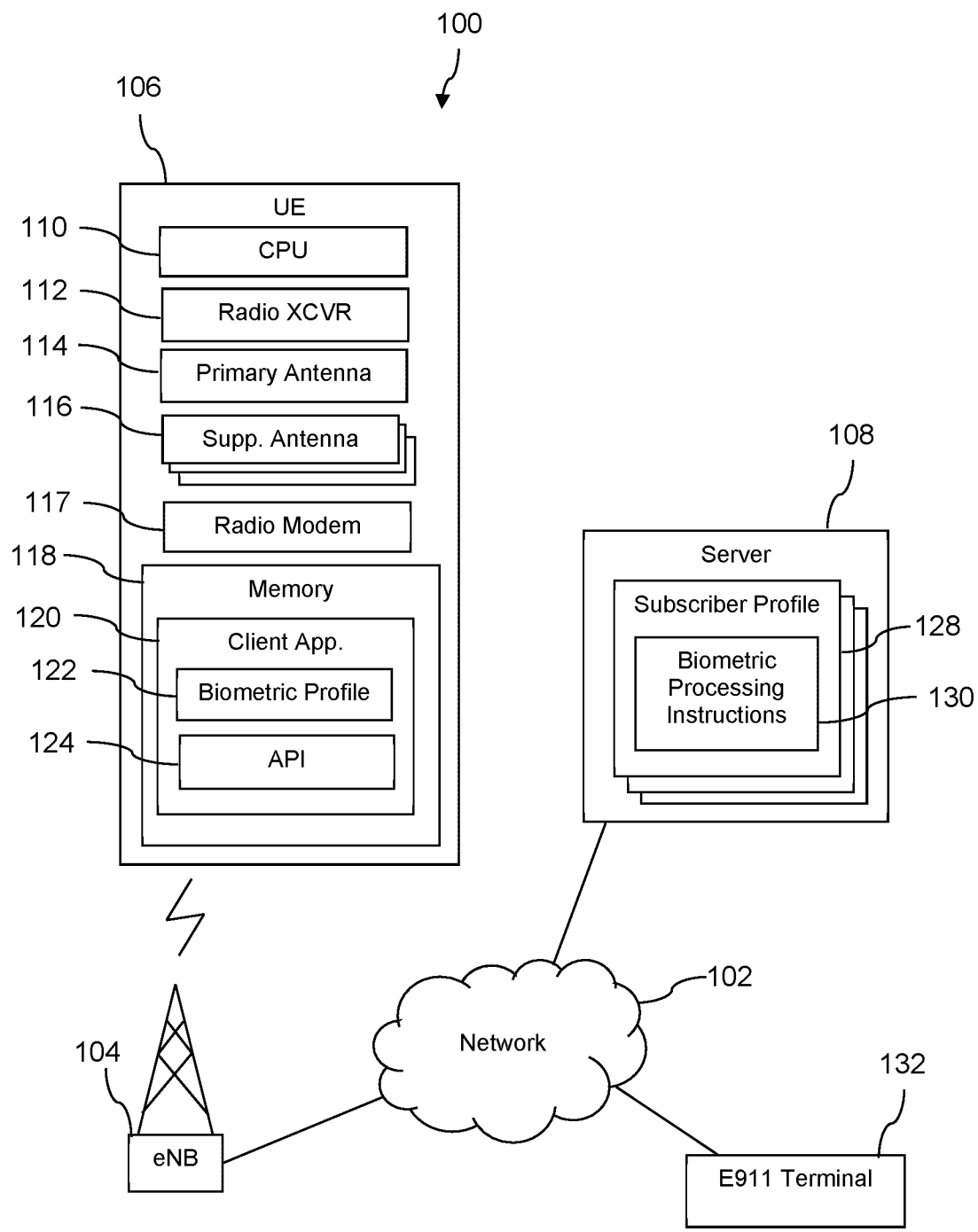
FIG. 1 is a block diagram of an ordered commit merging system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication devices have become able to process higher bandwidth and data throughput as cellular communication networks evolve from one generation to the next generation. As cellular networks become more sophisticated, mobile communication device technology has also advanced in order to support the increased bandwidth and data throughput requirements. Cellular networks today may be used to keep a call connected, stream content, and carry out other activities on mobile communication devices. To sustain the increased data throughput, a variety of hardware components have been developed to implement in mobile communication devices, such as multiple input, multiple output (MIMO) antennas and carrier aggregation.

Many mobile communication devices sold and used today that support 5G are built with hardware and software capabilities to support both 4G/LTE and 5G. MIMO antennas and carrier aggregation radio capabilities allow mobile communication devices to be able to send and receive more data simultaneously and allows more users to connect to the network and maintain high throughput. Additionally, these features may provide improved performance in a poor radio network environment. For example, 4×4 MIMO comprises four antennas for four data streams and may provide improved wireless signal strength to a mobile communication device. These additional components may use significant resources and cause an increased burden on the mobile communication device and network. For example, MIMO and carrier aggregation may consume battery power of the mobile communication device more quickly and use more network radio resources in order to provide the enhanced 5G cellular service. Default settings on some applications may use MIMO to provide increased data capacity. For example, video streaming applications, gaming applications, browser applications, email applications, and other applications may by default, use MIMO features. It may not be necessary or desired for the mobile communication device to always provide peak cellular service, so MIMO and carrier aggregation capabilities may not always be needed. It may be desirable to manage and/or control the use of these features. For example, by limiting the use of MIMO and carrier aggregation when these features are not needed, a mobile communication device may be able to conserve battery power, and a service provider may be able to reduce network resources allocated to that mobile communication device and improve network efficiency for other customers in that region.

The present disclosure teaches a system and methods for adapting antenna usage by a mobile communication device based on a rule set associated with a user's identity and based on an operation context of the mobile communication device. In an embodiment, the user's identity may account for a biometric profile of a user that may be stored on a client application executing on a processor of the mobile communication device. For example, biometric authentication such as facial recognition or a fingerprint scan may be used to authenticate a user's identity and unlock the device. The face scan and/or fingerprint scan used for the biometric authentication may be a part of the user's biometric profile. In some instances, a mobile communication device may recognize more than one biometric profile, and the client application may store more than one biometric profile. In an embodiment, the user's identity may be authenticated based on a password or personal identification number (PIN) that has been previously established on the mobile communication device.

In an embodiment, the user may be a subscriber to a cellular service provider and the service provider may provide cellular service to the user's mobile communication device. For example, the mobile communication device may have features, such as 4×4 MIMO and carrier aggregation, to support 4G/LTE and 5G technologies as the user travels between 4G/LTE and 5G coverage zones. For a mobile communication device with a plurality of antennas, such as 4×4 MIMO, there may be one primary antenna that establishes a data stream between the cell tower and mobile communication device and secondary, tertiary, and quaternary antennas that transmit supplementary data streams to increase data throughput and improve network connectivity. In an embodiment, the secondary, tertiary, and quaternary antennas may be referred to as supplementary antennas. In some instances, it may be desirable to configure the mobile communication device to use all of the antennas, such as when the user streams video on the mobile communication device, wherein activating and providing power to all antennas may provide better streaming quality to the user.

Alternatively, in other instances the user may be in a situation where it may not be necessary for all of the plurality of antennas to be active and receiving power at the same time. For example, one or more supplementary antennas may be powered off based on an operation context of the mobile communication device to conserve battery power and reduce use of network resources while a student is attending school during the day. In an embodiment, an operation context of the mobile communication device may comprise a time of day, a day of week, a current location of the device (e.g., determined by a Global Positioning System (GPS) location or triangulation from nearby cell towers), or a combination thereof. A student is unlikely to use or may be discouraged from using high-speed data on his or her mobile communication device while at school. In an embodiment, a biometric profile of the student may be stored on the mobile communication device. The student may use aspects of the biometric profile (e.g., a facial scan or a fingerprint scan) to authenticate his or her identity to unlock the device. A client application executing on a processor of the mobile communication device may analyze the biometric characteristic used to verify access to the device and recognize that it matches a biometric feature in the user's biometric profile. In an embodiment, the student may use a numeric or alphanumeric PIN to authenticate access to the device, and the client application may verify the student's identity using the PIN.

In an embodiment, additional information associated with the user may be stored in a server on the network. For example, the user's biometric profile may comprise a subscriber identifier of a subscriber profile associated with the user's account managed by the service provider. The subscriber identifier may be a unique string of alphanumeric characters used by the service provider to differentiate and identify unique service subscribers. The subscriber profile may be stored in a network server. The subscriber profile may comprise information such as demographic information (e.g., the user's age, gender, occupation, billing zip code, and residential zip code) and biometric processing instructions. Biometric processing instructions may comprise rule sets that instruct the client application of certain antenna operation settings of the mobile communication device under certain operation contexts associated with the user's identity. An operation context of the mobile communication device may be determined based on a temporal component (e.g., time of day, a day of week, month of year) and/or a physical locational component of the device (e.g., Global Positioning System (GPS) location, triangulation from nearby cell towers, or connectivity to WiFi access points), or a combination thereof. In an embodiment, the biometric processing instructions may account for a user's identity and an operation context of the device. An application programming interface (API) invoked on the client application may send a request for the biometric processing instructions associated with the user's subscriber identifier, receive the biometric processing instructions from the server, evaluate the operation context of the mobile communication device, and carry out the actions set forth (e.g., disabling the supplementary 4×4 MIMO antennas) in the biometric processing instructions. In an embodiment, carrying out the biometric processing instructions may comprise commanding a radio modem of the mobile communication device to configure itself to the antenna operation setting associated with the operation context.

In an embodiment, the biometric processing instructions may be preprogrammed and preset by the service provider based on parameters of the user's demographics. For example, the service provider may program the biometric processing instructions to disable power to the supplementary antennas of the mobile communication device during school hours (e.g., 8 A.M.-4 P.M.) for an age group of school-aged users (e.g., ages 10-18) who are at school, determined based on the GPS coordinates of the mobile communication device. The service provider may use information available in the user's subscriber profile, such as demographics information, to set the biometric processing instructions for the user. In another embodiment, the user or someone associated with the user (e.g., the user's parents) may configure a specific rule set for the user. For example, a student's parents may adjust the hours that power to the supplementary antennas is disabled to be from 8 A.M.-12 P.M. and then from 1 P.M.-4 P.M., so that the student may have access to high-speed data during his or her lunch period. In an embodiment, the student may desire to enable MIMO capabilities, but the biometric processing instructions indicate that the antenna operation setting should restrict use of supplementary antennas and prevents the user from using MIMO. Disabling supplementary antennas when high-speed data usage is not anticipated may lower battery consumption and reduce network resources that are allocated to the mobile communication device. The reduction in network resources allocated to the device may improve network efficiency for other customers serviced by the same cell tower.

In an embodiment, the biometric processing instructions may incorporate the operation context of the mobile communication device as a condition for the antenna operation setting, and the client application may evaluate the operation context of the mobile communication device, such as time of day and/or the device's location. Following the previous example, where the biometric processing instructions direct the antennas to be powered off during school hours while the user is at school, the client application may evaluate the user's location to be at another location, for example, the user may be taking a sick day and remain at home during school hours. In an embodiment, a user's biometric profile may be associated with more than one set of biometric processing instructions. For example, the biometric processing instructions may be configured to enable all antennas if the user is at home during school hours, where the user's location may be determined by the mobile communication device's GPS coordinates and compared to a residential address or zip code of the user's subscriber profile. For another example, the biometric processing instructions may be configured to enable all antennas during evening hours with no condition as to where the user is located.

In an embodiment, a mobile communication device may be associated with more than one biometric profile. A second user, such as a parent, may be able to authenticate and access the device biometrically (e.g., through facial recognition or a fingerprint scan). The client application may distinguish the second user's biometric profile, wherein the antenna operation setting associated with the second user's biometric processing instructions may not impose limitations on the availability of the supplementary antennas and the second user has permission to use of all antennas. Alternatively, biometric processing instructions associated with the second user's biometric profile may impose different limitations on antenna configuration during certain operation contexts (e.g., at certain times and/or in certain locations). For example, if the second user (e.g., the student's parent) authenticates his or her identity to the mobile communication device while visiting the first user (e.g., the student) at school during school hours, the client application may recognize the second user's biometric profile and the associated biometric processing instructions that do not restrict use of the supplementary antennas. The client application may invoke the API to turn on power to all antennas so that the second user may experience optimal cellular service. After the second user (e.g., the student's parent) leaves or ceases the session on the mobile communication device, the first user (e.g., the student) may authenticate and unlock the mobile communication device with the first user's biometrics. The client application may invoke the API and once again turn off the supplementary antennas according to the biometric processing instructions associated with the first user's biometric profile.

In another example, the user may be a senior-aged person and may not need continuous high-speed data on his mobile communication device. His biometric profile may be stored on the mobile communication device and reference a subscriber identifier. The client application may use the subscriber identifier to request the user's subscriber profile on a network server via an API. The subscriber profile may comprise biometric processing instructions, wherein the biometric processing instructions sets forth a rule set that directs the API to manage certain hardware or software components of the mobile communication device. For example, for the senior-aged user, the biometric processing instructions may call for the API to command a radio modem to disable the supplementary antennas of the device so that only the primary antenna is receiving cellular service. This way, the user may still receive and make phone calls on the cellular network.

In an embodiment, the user may experience an emergency and initiate a phone call to emergency services (E911). The mobile communication device may be operating in a state where not all of the antennas are operating. An E911 call system may send a command to override the antenna operation setting provided by the biometric processing instructions so that the client application enables all of the antennas of the mobile communication device via the API so that the mobile communication device receives optimal cellular service to transmit the E911 call. In an embodiment, an emergency may not be specific to an individual user, but rather affect a geographical area or be anticipated to affect a geographical area. For example, a tornado or wildfire may be predicted to affect a county or a cell tower coverage area. The E911 system may send an override command to all mobile communication devices in the region predicted to be affected. In an embodiment, the command to override the antenna operation setting may be sent by an emergency system associated with a municipality or other government entity to the mobile communication devices in the region predicted to be affected. The override command may direct the client application to override the antenna operation setting and enable all of the antennas of the mobile communication device so that all the mobile communication devices that receive the override command are able to receive optimal cellular service in case the user initiates an E911 call or in case the E911 or government system transmits information about the emergency to the mobile communication devices in the region.

Turning now to FIG. 1, an antenna management system 100 is described. In an embodiment, the system 100 comprises a network 102, a cell site 104, a mobile communication device (user equipment—UE) 106, and a server 108. A UE 106 may be a cell phone, a mobile phone, a smart phone, a personal digital assistant (PDA), an Internet of things (IoT) device, a wearable computer, a headset computer, a laptop computer, a tablet computer, or a notebook computer. The network 102 may be one or more private networks, one or more public networks, or a combination thereof. The cell site 104 provides wireless communication links to the UE 106 according to a 5G, a long-term evolution (LTE), a code division multiple access (CDMA), or a global system for mobile communications (GSM) wireless telecommunication protocol. It is understood that the system 100 may comprise any number of cell sites 104, UEs 106, and servers 108.

The UE 106 comprises a processor 110, one or more radio transceivers 112, a primary antenna 114, a plurality of supplementary antennas 116, and a radio modem 117. The UE 106 may be able to support two or more different wireless telecommunication protocols, for example, the UE 106 may comprise hardware and software components to support 5G and 4G/LTE wireless telecommunication protocols. UE 106 may have 4×4 MIMO and carrier aggregation features to improve wireless cellular service to the UE 106. 4×4 MIMO comprises four antennas for four data streams, wherein there may be one primary antenna 114 that establishes a data stream between the cell site 104 and UE 106 and secondary, tertiary, and quaternary antennas that transmit supplementary data streams to increase data throughput and improve network connectivity. The secondary, tertiary, and quaternary antennas may be referred to as supplementary antennas 116. The user of the UE 106 may be a subscriber of a service provider that provisions cellular service on the network 102 to the UE 106.

UE 106 further comprises a non-transitory memory 118 and a client application 120 stored in the non-transitory memory 118 comprising a biometric profile 122 of the user and an application programming interface (API) 124. The client application 120 may be encapsulated in an operating system of the UE 106. The client application 120 may authenticate a session on the UE 106 by determining the identity of a user based on an input. In an embodiment, the client application 120 may authenticate the user's identity based on a biometric input. The client application 120 may prompt the user to input a biometric input, analyze the biometric input, and authenticate the identity of the user. The biometric input may be associated with the biometric profile 122. The biometric profile 122 may comprise biometric information, such as a facial scan for facial recognition or a fingerprint scan of the user that the UE 106 uses to authenticate the user's identity and unlock the UE 106. The client application 120 may recognize that the biometric input used to verify access to UE 106 matches a biometric feature of the user's biometric profile 122. In an embodiment, the client application 120 may authenticate the user's identity based on inputting a password or a personal identification number (PIN) that has been previously established on the UE 106. The biometric profile 122 may comprise additional information such as a subscriber identifier associated with the user's account managed by the service provider. The subscriber identifier may be a unique string of alphanumeric characters used by the service provider to differentiate and identify service subscribers.

Additional information about the user may be stored on the server 108. The server 108 comprises a plurality of subscriber profiles 128. In an embodiment, the subscriber identifier from biometric profile 122 may reference a subscriber profile 128 associated with the user on the server 108. The subscriber profile 128 may comprise additional information about the user. For example, subscriber profile 128 may comprise demographic data about the user, selected from the list consisting of the user's age, gender, occupation, billing zip code, and residential zip code. The subscriber profile 128 may comprise information about the UE 106, such as an electronic serial number (ESN), a mobile equipment identifier (MEID), an international mobile equipment identity (IMEI), or some other device information of the UE 106. The subscriber profile 128 may further comprise biometric processing instructions 130. Biometric processing instructions 130 may comprise rule sets that instruct the client application 120 of antenna operation settings associated with an operation context of the UE 106 and the user's identity. An operation context of the UE 106 may comprise a time of day, a day of week, a current location of the device (e.g., determined by a Global Positioning System (GPS) location or triangulation from nearby cell towers), or a combination thereof. For example, antenna operation settings may set forth antenna configurations that disable power to one or more supplementary antennas 116 based on a time of day and a current location of the UE 106. In an embodiment, the biometric processing instructions 130 may account for a user's identity based on the user's biometric profile 122 or based on entering a valid numeric or alphanumeric password/PIN on the UE 106.

In an embodiment, the application programming interface (API) 124 may be invoked on the client application 120 to request the biometric processing instructions 130 of a subscriber profile 128 on the server 108 associated with the subscriber identifier of the user of the UE 106, receive the biometric processing instructions 130 from the server 108, and carry out the instructions set forth by the biometric processing instructions 130 according to the operation context of the UE 106. In an embodiment, the API 124 may command the radio modem 117 to configure itself according to the biometric processing instructions 130. For example, the biometric processing instructions 130 may direct the API 124 to disable power to all of the supplementary antennas 116 if the user is at school during school hours.

In an embodiment, the biometric processing instructions 130 may be preprogrammed and preset by the service provider based on categorizing the user's demographic information from the subscriber profile 128 based on certain parameters. For example, the service provider may program the biometric processing instructions 130 to disable power to supplementary antennas 116 of the UE 106 during school hours (e.g., 8 A.M.-4 P.M.) for an age group of school-aged users (e.g., ages 10-18) who are at school, based on the GPS coordinates of the UE 106. In another embodiment, the user or an authorized person (e.g., the user's parents) may configure a specific rule set for the user. One or more persons who are authorized to configure biometric processing instructions 130 for UE 106 may be designated with the service provider. Turning off power to the supplementary antennas 116 may reduce battery consumption for the UE 106 and free up network resources on the network 102 that the UE 106 would otherwise use. The reduction in network resources may improve network efficiency for other subscribers serviced by the cell site 104.

The biometric processing instructions 130 may be stored on the client application 120 and the client application 120 may periodically retrieve the biometric processing instructions 130 via the API 124 from the server 108 so that the client application 120 obtains up-to-date biometric processing instructions 130 when modifications are made to the biometric processing instructions 130. For example, the client application 120 may request biometric processing instructions 130 from the server 108 via API 124 every twelve hours, every day, every week, every two weeks, or some other period of time. The client application 120 may also reach out to the server 108 via API 124 for biometric processing instructions 130 upon the occurrence of an event, for example, when a new biometric profile 122 is created on UE 106, when a new user is designated to have the authority to configure biometric processing instructions 130 on a subscriber profile 128, or when the subscriber updates information on the subscriber profile 128.

A UE 106 may recognize biometric inputs from more than one user for authentication to unlock and access the UE 106, thereby creating more than one biometric profile 122 on the client application 120. Each biometric profile 122 may be associated with a different subscriber profile 128 comprising different biometric processing instructions 130. In an embodiment, biometric processing instructions 130 associated with the second user's biometric profile 122 may impose a different set of antenna operation settings. For example, antenna operation settings associated with the second user may impose no limitations at all on the usability of the supplementary antennas 116 so that the second user may have full use of both primary antenna 114 and supplementary antennas 116 while the antenna operation settings associated with the first user may limit use of supplementary antennas 116. For example, if the second user authenticates his or her biometric identity on UE 106, the client application 120 may distinguish the second user's biometric profile 122 from the first user's biometric profile 122 and evaluate biometric processing instructions 130 of the second user. The client application 120 may invoke API 124 to command the radio modem 117 to switch on or switch off supplementary antennas 116 according to the biometric processing instructions 130 of the second user. If the second user terminates the session on UE 106, and the first user thereby initiates a new session on UE 106 through biometric authentication, the client application 120 recognizes that biometric input is associated with the biometric profile 122 of the first user and that the biometric processing instructions 130 of the first user should be implemented. The client application 120 may invoke API 124 to implement the biometric processing instructions 130 of the first user.

In an embodiment, the user of the UE 106 may experience an emergency whereby the user initiates a call to emergency services (E911). For example, the user may be a senior-aged person who suffers a fall and calls E911. The system 100 may further comprise an E911 terminal 132 that processes E911 calls. When the E911 call is initiated, UE 106 may be operating in a state where supplementary antennas 116 are powered off according to the biometric processing instructions 130. It may be desirable to override biometric processing instructions 130 so that all antennas, both primary antenna 114 and supplementary antennas 116, are powered on and communicatively coupled to the network 102 (e.g., has a wireless link provided by cell site 104) in order to increase the chances that the E911 call connects to E911 terminal 132. The client application 120 may receive a command to override the antenna operation setting and invoke the API 124 to configure the radio modem 117 to use all of primary antenna 114 and supplementary antennas 116 at the same time.

In an embodiment, an emergency may affect multiple users located in a geographical area or be anticipated to affect multiple users located in a geographical area. For example, a tornado or wildfire may be predicted to affect a county or a cell site 104 coverage area. The E911 terminal 132 may send an override command to all UEs 106 in the region predicted to be affected. In an embodiment, the command to override the antenna operation setting may be sent by an emergency system associated with a municipality or other government entity to the UEs 106 in the region predicted to be affected. The override command may direct the client application 120 to override the antenna operation setting and enable all of the antennas of the UE 106 so that all of the UEs 106 that receive the override command are able to receive optimal cellular service in case an E911 call is initiated or in case the E911 or government system transmits information about the emergency to the UEs 106 in the region. In an embodiment, the service provider may detect a decrease in network service for a geographical area covered by one or more cell sites 104 and invoke API 124 to override biometric processing instructions 130 so that the subscriber does not experience a loss of cellular service.

Figure 2:
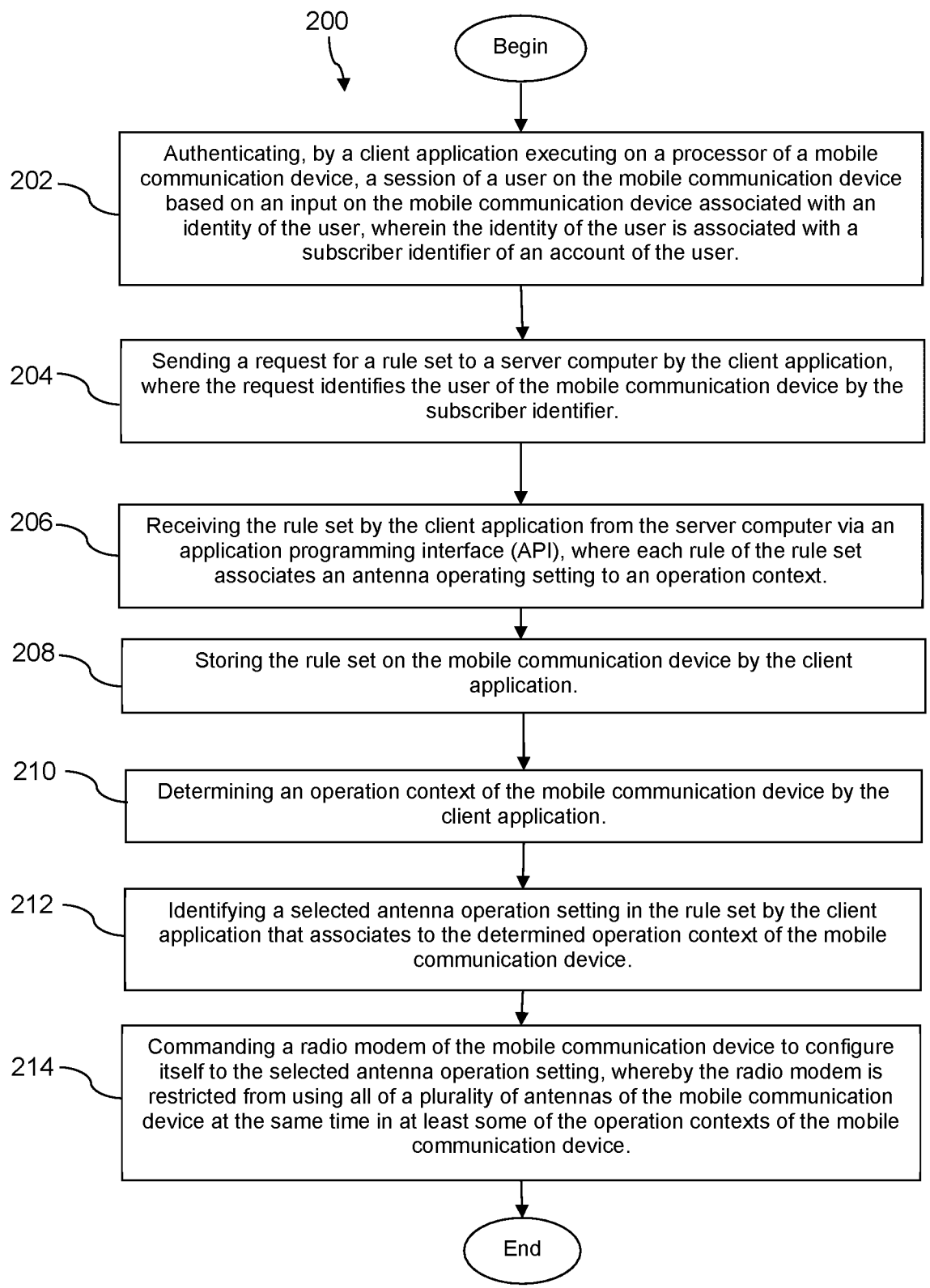
FIG. 2 is a flow chart of a method according to an embodiment of the disclosure.

Turning now to FIG. 2, a method 200 is described. In an embodiment, the method 200 comprises a method of adapting antenna usage by a mobile communication device based on a rule set and based on an operation context of the mobile communication device. At block 202, the method 200 comprises authenticating, by a client application executing on a processor of a mobile communication device, a session of a user on the mobile communication device based on an input on the mobile communication device associated with an identity of the user, wherein the identity of the user is associated with a subscriber identifier of an account of the user. At block 204, the method 200 comprises sending a request for a rule set to a server computer by the client application, where the request identifies the user of the mobile communication device by the subscriber identifier. At block 206, the method 200 comprises receiving the rule set by the client application from the server computer via an application programming interface (API), where each rule of the rule set associates an antenna operating setting to an operation context. The operation context may be based on a time of day or the location of the UE 106. At block 208, the method 200 comprises storing the rule set on the mobile communication device by the client application.

The method 200 further comprises, at block 210, determining an operation context of the mobile communication device by the client application. At block 212, the method 200 comprises identifying a selected antenna operation setting in the rule set by the client application that associates to the determined operation context of the mobile communication device. At block 214, the method 200 comprises commanding a radio modem of the mobile communication device to configure itself to the selected antenna operation setting, whereby the radio modem is restricted from using all of a plurality of antennas of the mobile communication device at the same time in at least some of the operation contexts of the mobile communication device. In an embodiment, API 124 may be invoked by the client application 120 to command the radio modem 117 to configure itself to the selected antenna operation setting.

Figure 3:
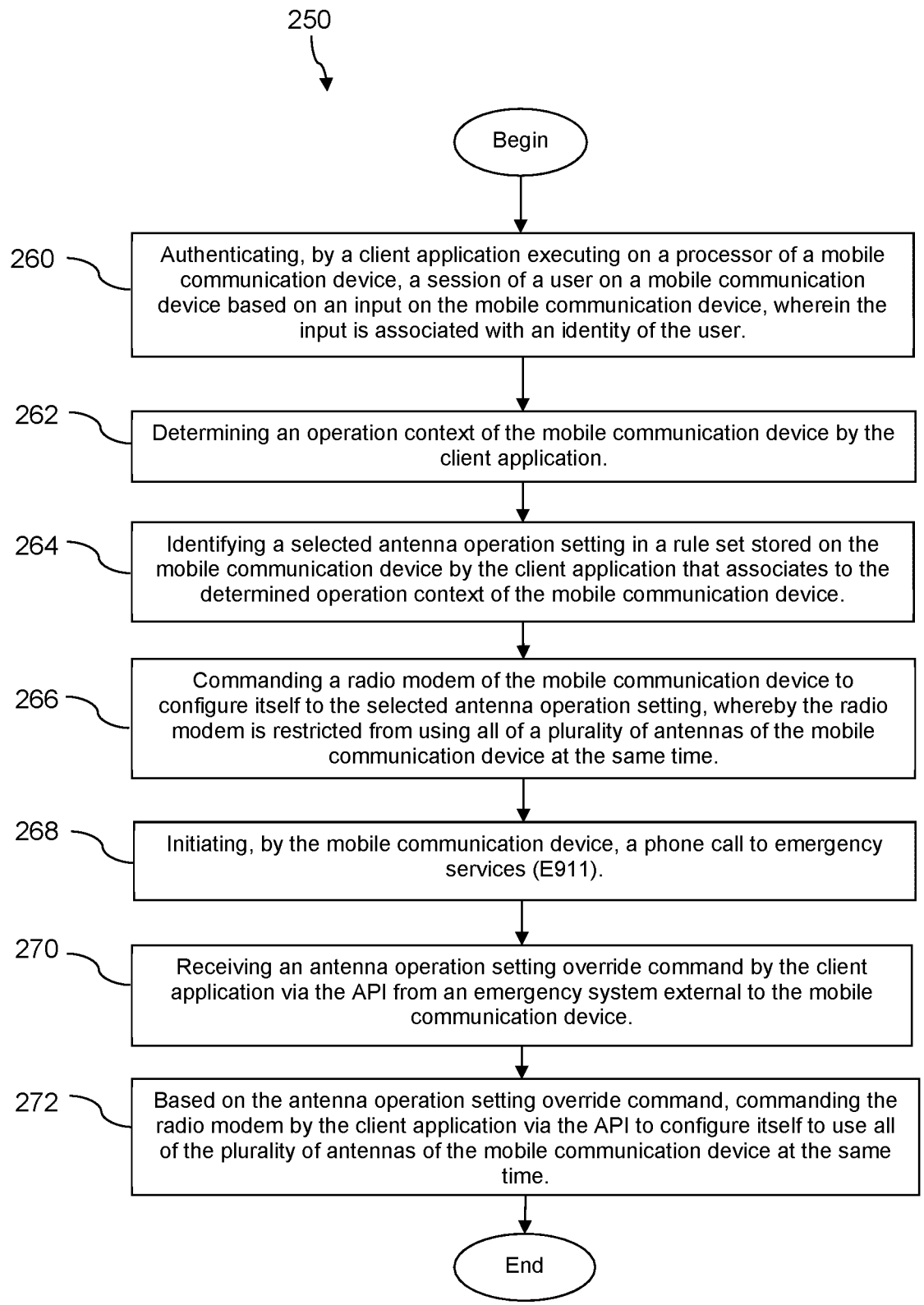
FIG. 3 is a flow chart of another method according to an embodiment of the disclosure.

Turning now to FIG. 3, a method 250 is described. In an embodiment, the method 250 comprises a method for adapting antenna usage by a mobile communication device based on a rule set and based on an operation context of the mobile communication device. At block 260, the method 250 comprises authenticating, by a client application executing on a processor of a mobile communication device, a session of a user on a mobile communication device based on an input on the mobile communication device, wherein the input is associated with an identity of the user. At block 262, the method 250 comprises determining an operation context of the mobile communication device by the client application. At block 264, the method 250 comprises identifying a selected antenna operation setting in a rule set stored on the mobile communication device by the client application that associates to the determined operation context of the mobile communication device. At block 266, the method 250 comprises commanding a radio modem of the mobile communication device to configure itself to the selected antenna operation setting, whereby the radio modem is restricted from using all of a plurality of antennas of the mobile communication device at the same time.

The method 250 further comprises, at block 268, initiating, by the mobile communication device, a phone call to emergency services (E911). An E911 terminal 132 may handle and direct E911 calls in a certain geographic region. At block 270, the method 250 comprises receiving an antenna operation setting override command by the client application via an API from an emergency system external to the mobile communication device. The E911 terminal 132 may send the override command to the UE 106. At block 272, the method 250 comprises, based on the antenna operation setting override command, commanding the radio modem by the client application via the API to configure itself to use all of the plurality of antennas of the mobile communication device at the same time.

Figure 4:
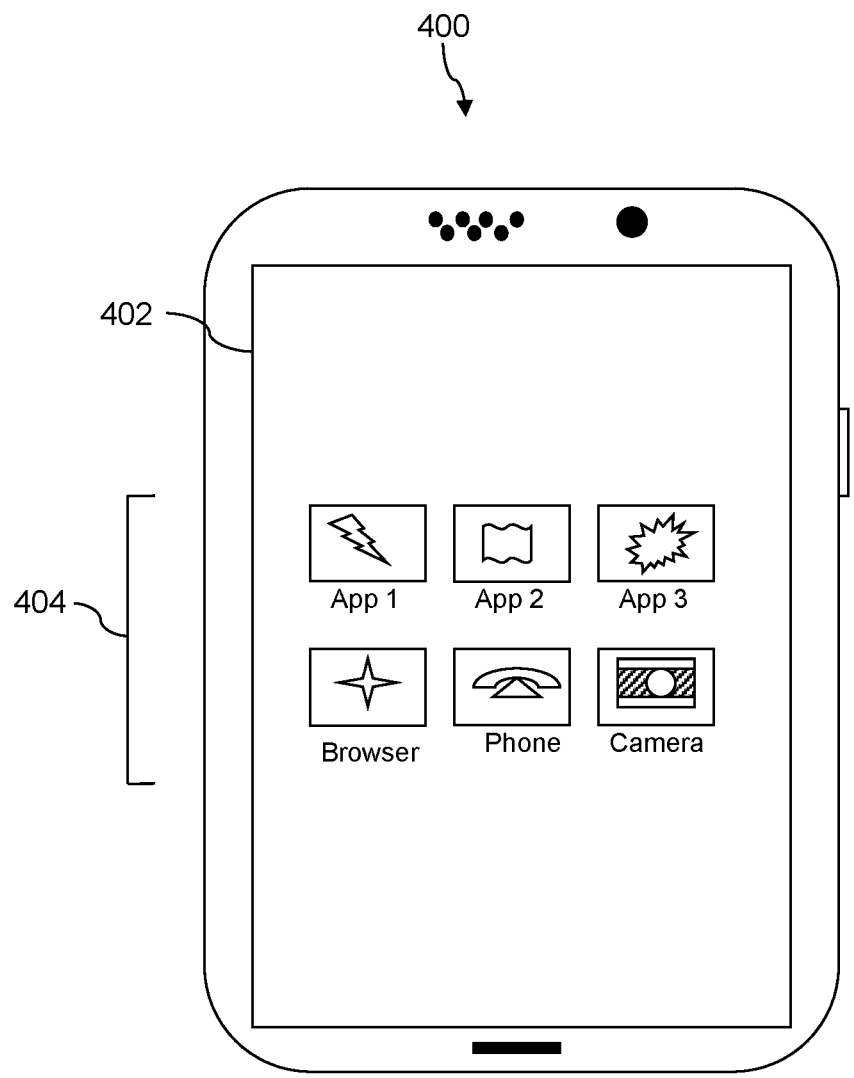
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
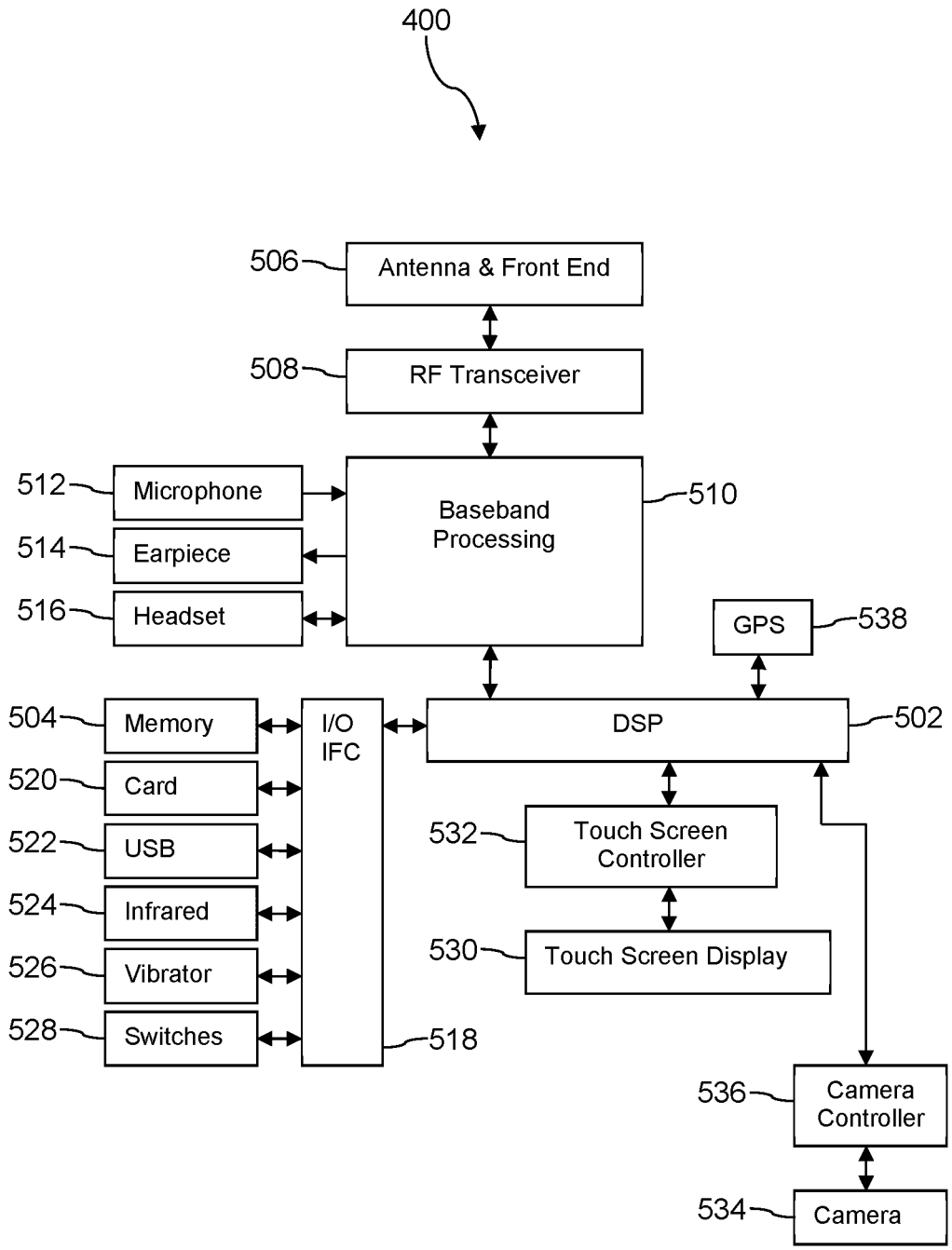
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
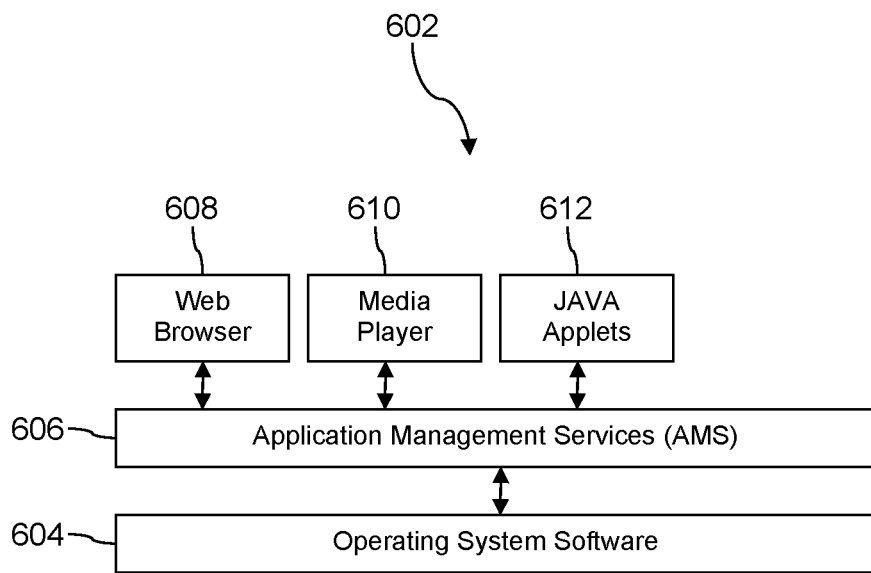
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
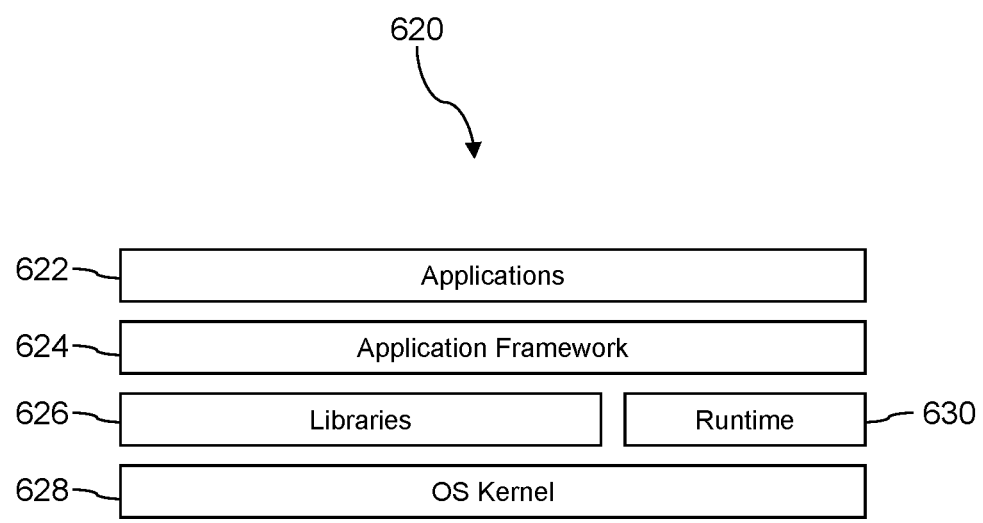
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
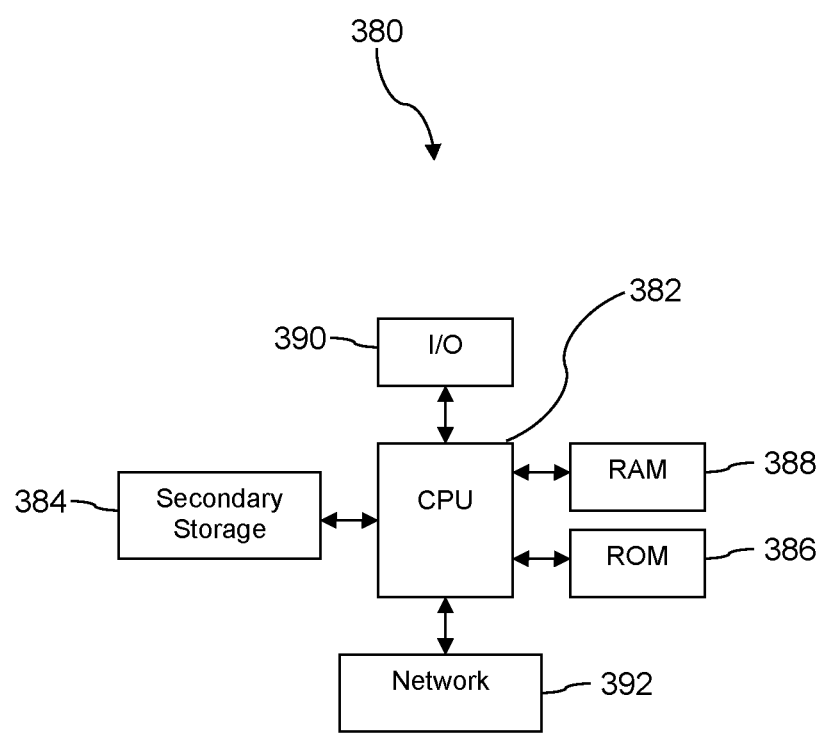
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of adapting antenna usage by a mobile communication device based on a rule set and based on an operation context of the mobile communication device, comprising:
    authenticating, by a client application executing on a processor of a mobile communication device, a session of a user on the mobile communication device based on an input on the mobile communication device associated with an identity of the user, wherein the identity of the user is associated with a subscriber identifier of an account of the user;
    sending a request for a rule set to a server computer by the client application, where the request identifies the user of the mobile communication device by the subscriber identifier;
    receiving the rule set by the client application from the server computer via an application programming interface (API), where each rule of the rule set associates an antenna operating setting to an operation context;
    storing the rule set on the mobile communication device by the client application;
    determining an operation context of the mobile communication device by the client application;
    identifying a selected antenna operation setting in the rule set by the client application that associates to the determined operation context of the mobile communication device; and
    commanding a radio modem of the mobile communication device to configure itself to the selected antenna operation setting, whereby the radio modem is restricted from using all of a plurality of antennas of the mobile communication device at the same time in at least some of the operation contexts of the mobile communication device.

2. The method of claim 1, wherein determining the operation context is based on one or more of a time of day, a day of week, and a current location of the mobile communication device.

3. The method of claim 1, wherein the client application periodically retrieves the rule set from the network server every twelve hours, every day, every week, and every two weeks.

4. The method of claim 1, wherein the client application retrieves the rule set upon the occurrence of an event.

5. The method of claim 4, wherein an event occurs upon the creation of a new biometric profile on the mobile communication device.

6. The method of claim 1, wherein the mobile communication device is a cell phone, a mobile phone, a smart phone, an Internet of things (IoT) device, a personal digital assistant (PDA), a wearable computer, a headset computer, a laptop computer, a notebook computer, or a tablet computer.

7. The method of claim 1, wherein the mobile communication device establishes a telecommunications protocol according to one of a 5G, a long-term evolution (LTE), a code division multiple access (CDMA), or a global system for mobile communications (GSM) telecommunications protocol.

8. The method of claim 1, wherein the mobile communication device comprises hardware and software capabilities to support two or more different wireless telecommunication protocols.

9. A method of adapting antenna usage by a mobile communication device based on a rule set and based on an operation context of the mobile communication device, comprising:
- authenticating, by a client application executing on a processor of a mobile communication device, a session of a user on the mobile communication device based on an input on the mobile communication device, wherein the input is associated with an identity of the user;
- determining an operation context of the mobile communication device by the client application;
- identifying a selected antenna operation setting in a rule set stored on the mobile communication device by the client application that associates to the determined operation context of the mobile communication device;
- commanding a radio modem of the mobile communication device to configure itself to the selected antenna operation setting, whereby the radio modem is restricted from using all of a plurality of antennas of the mobile communication device at the same time;
- initiating, by the mobile communication device, a phone call to emergency services (E911);
- receiving an antenna operation setting override command by the client application via an application programming interface (API) from an emergency system external to the mobile communication device; and
- based on the antenna operation setting override command, commanding the radio modem by the client application via the API to configure itself to use all of the plurality of antennas of the mobile communication device at the same time.

10. The method of claim 9, wherein an E911 terminal invokes the API to override the selected antenna operation setting.

11. The method of claim 9, wherein the mobile communication device is provisioned to receive cellular service on a cellular network maintained by a service provider.

12. The method of claim 9, wherein the service provider detects a decrease in network service for a geographical area covered by one or more cell sites and invokes the API to override the rule set and configure itself to use all of the plurality of antennas of the mobile communication device at the same time.

13. The method of claim 9, wherein the client application invokes an application programming interface (API) to command the radio modem to configure itself to the selected antenna operation setting.

14. A mobile communication device that adapts its usage of antennas based on a rule set and based on an operation context of the mobile communication device, comprising:
- a plurality of antennas;
- a radio modem;
- a processor;
- a non-transitory memory coupled to the processor; and
- a client application stored in the non-transitory memory that, when executed by the processor:
  - authenticates a session of a user on the mobile communication device based on an input on the mobile communication device associated with an identity of the user, wherein the identity of the user is associated with a subscriber identifier of an account of the user,
  - sends a request for a rule set to a server computer via the radio modem, where the request identifies the user of the mobile communication device by the subscriber identifier,
  - receives the rule set from the server computer, wherein the rule set is associated with a subscriber profile identified by the subscriber identifier,
  - stores the rule set in the non-transitory memory,
  - evaluates the rule set based on the operation context to determine a radio modem antenna operation setting, and
  - commands the radio modem to configure itself to the radio modem antenna operation setting, whereby the radio modem is restricted from using all of the plurality of antennas at the same time in at least some operation contexts of the mobile communication device.

15. The mobile communication device of claim 14, wherein the client application determines the identity of the user to authenticate the session by prompting the user to input a biometric input, analyzing the biometric input, and authenticating the identity of the user, wherein the biometric input is associated with a biometric profile stored in the non-transitory memory.

16. The mobile communication device of claim 14, wherein the subscriber profile further comprises demographic information of the user selected from the list consisting of the user's age, gender, occupation, billing zip code, and residential zip code.

17. The mobile communication device of claim 16, wherein the rule set is preconfigured by a service provider according to the demographic information of the subscriber profile.

18. The mobile communication device of claim 17, wherein the rule set may be configured for the user by one or more individuals designated by the subscriber profile.

19. The mobile communication device of claim 17, wherein the plurality of antennas is 4×4 MIMO comprising one primary antenna and three supplementary antennas.

20. The mobile communication device of claim 19, wherein the rule set directs the client application to invoke an application programming interface (API) to command the radio modem to disable power to the supplementary antennas.

* * * * *